(12) United States Patent
Geukens

(10) Patent No.: US 8,599,663 B1
(45) Date of Patent: Dec. 3, 2013

(54) HIGH SPEED FORWARD SENSE SAMPLING IN OPTICAL DRIVES USING PLACED DATA PATTERNS

(75) Inventor: Tom Geukens, Boulder, CO (US)

(73) Assignee: Marvell International Ltd., Hamilton (BM)

( * ) Notice: Subject to any disclaimer, the term of this patent is extended or adjusted under 35 U.S.C. 154(b) by 1457 days.

(21) Appl. No.: 12/247,009

(22) Filed: Oct. 7, 2008

Related U.S. Application Data

(60) Provisional application No. 60/980,032, filed on Oct. 15, 2007.

(51) Int. Cl.
- *G11B 17/00* (2006.01)
- *G11B 7/00* (2006.01)
- *G11B 27/36* (2006.01)
- *G11B 20/18* (2006.01)
- *G11B 5/09* (2006.01)
- *G11B 20/14* (2006.01)

(52) U.S. Cl.
USPC .............. 369/47.53; 369/124.12; 369/124.15; 369/44.41; 369/53.22; 369/53.27; 369/44.27; 369/44.39; 369/47.55; 369/53.37; 369/53.45; 369/44.34; 369/47.35; 369/59.21

(58) Field of Classification Search
USPC ................. 369/47.53, 124.12, 124.15, 44.41, 369/53.22, 53.27, 44.27, 44.39, 47.55, 369/53.37, 53.45, 44.34, 47.35, 59.21
See application file for complete search history.

(56) References Cited

U.S. PATENT DOCUMENTS

| | | | |
|---|---|---|---|
| 2002/0172114 A1* | 11/2002 | Shimizu et al. ............. | 369/47.51 |
| 2002/0191520 A1* | 12/2002 | Nagata et al. .............. | 369/59.23 |
| 2003/0063541 A1* | 4/2003 | Nagata et al. .............. | 369/59.11 |
| 2004/0037176 A1* | 2/2004 | Morishima ................ | 369/44.26 |
| 2004/0208106 A1* | 10/2004 | Minemura ................. | 369/59.22 |
| 2004/0257932 A1* | 12/2004 | Osakabe et al. ............ | 369/47.5 |
| 2005/0013228 A1* | 1/2005 | Miyamoto et al. .......... | 369/59.11 |
| 2006/0092792 A1* | 5/2006 | Hanks et al. ............... | 369/47.53 |

\* cited by examiner

*Primary Examiner* — Aneeta Yodichkas

(57) ABSTRACT

An approach is described that allows an optical disc drive to accurately verify the power level of irradiation beam power levels associated a write strategy used in high speed, high density optical disc media formats using a front monitor diode with a relatively slow rise time and/or relative slow fall time compared to the clock cycle speed of the write strategy signal. A portion of encoded data to be written to an optical disc media may be overwritten to include a predetermined data pattern. During write strategy processing of the data, the predetermined data pattern is replaced with a constant write strategy power level. The constant write strategy output placed within the write strategy signal may control the optical disc drive laser to emit a constant irradiation beam for a duration sufficiently long to allow the front monitor diode to obtain an accurate measure of the irradiation beam power level.

29 Claims, 10 Drawing Sheets

HIGH SPEED FORWARD SENSE SAMPLING IN OPTICAL DRIVES USING PLACED DATA PATTERNS

INCORPORATION BY REFERENCE

This application claims the benefit of U.S. Provisional Application No. 60/980,032, "INSERT SPECIAL DATA PATTERN FOR HIGH SPEED FORWARD SENSE SAMPLING IN OPTICAL DRIVES" filed by Tom Geukens on Oct. 15, 2007, which is incorporated herein by reference in its entirety.

BACKGROUND

Due to various reasons, such as laser diode deterioration, the irradiation power of a laser beam emitted from a write/read laser optics unit of an optical disc drive during the write and read processes may be closely monitored and adjusted, when necessary, to maintain the write laser irradiation power and read laser irradiation power at intended levels. Generally, the irradiation power can be monitored by a front monitor diode, or forward sensor.

FIG. 11 shows a captured computer screen display 1100 that presents a time response output voltage of an exemplary first forward sense (FS) device, e.g., a first front monitor diode (FMD), shown at 1102, in response to an output of a first laser diode, shown at 1104, driven by an optical disc drive write strategy signal. In the circuit output presented in FIG. 11, the rise time response of the first front monitor diode is sufficiently fast to achieve a peak output that corresponds with the peak power output of the first laser diode, and the fall time response of the first front monitor diode is sufficiently fast to achieve a low output that corresponds with the low power output of the first laser diode. The first front monitor diode response 1102 presented in FIG. 11 is similar to the response that may be produced by a front monitor diode within an optical disc drive in which the speed with which data is written to an optical disc media, i.e., the write strategy signal generated by the optical disc drive in response to an encoded data stream, is sufficiently slow for the front monitor diode to provide the optical disc drive with an accurate measure to the laser power output. For example, as shown in FIG. 11 at 1106 and at 1108, for each rise and fall in the laser first diode power output, there is a corresponding rise and fall in the output of the first front monitor diode in which the first front monitor diode reaches a minimum output and a maximum output in response to the minimum and maximum output of the first laser diode, respectively. In such an exemplary optical disc drive, the output of the front monitor diode may be sufficient to allow the optical disc drive to monitor, and adjust accordingly, the irradiation beam produced by a laser diode in response the power levels represented in a generated write strategy signal.

FIG. 12 shows a captured computer screen display 1200 that presents a time response output voltage of an exemplary second front monitor diode, shown at 1202, in response to an output of a second laser diode, shown at 1204, driven by an optical disc drive write strategy signal operating at an increased write speed as compared to the optical disc drive write strategy signal driving the first laser diode, shown in FIG. 11 at 1104, described above. In the circuit output presented in FIG. 12, the time response of the second front monitor diode does not have a sufficiently fast rise time to achieve a peak output that corresponds with high write power level output of the second laser diode. Such a delayed front monitor diode response may be produced by a front monitor diode in response to higher speed, higher density optical media write formats such as, for example, high-definition digital versatile disc (HD DVD), in which the write strategy frequency is increased. The rise times of front monitor diodes may be even further reduced for front monitor diodes used to monitor higher speed, higher density optical media write formats in which the write/read laser emits a narrow beam of light with a reduced wavelength, such as the blue-light laser used in optical disc drives that support optical disc formats such as blu-ray disc (BD). As further shown in FIG. 12, in optical disc drives that use higher density optical media write formats, the front monitor diode may not have a sufficiently fast fall time to accurately measure the low write power level of the laser diode.

The second front monitor diode response presented in FIG. 12 is similar to the response that may be found in an optical disc drive in which the speed with which data is written to an optical disc media, i.e., the write strategy signal generated by the optical disc drive in response to an encoded data stream, is too fast for the front monitor diode to provide the optical disc drive with an accurate measure to the laser power output. For example, as shown in FIG. 12 at 1206 and at 1208, for each rise and fall in the power output of the second laser diode, there is not a corresponding rise and fall in the output of the second front monitor diode in which the second front monitor diode reaches a minimum output and a maximum output in response to the minimum and maximum output of the second laser diode, respectively. Due to the slow rise time of the second front monitoring diode, the second front monitoring diode is not able to achieve a peak output before the output signal is forced to decay in response to a drop in the power output of the second laser diode. Therefore, the peak output of the second front monitor diode cannot be used as an accurate measure of the irradiation beam power emitted by the second laser diode. In such an exemplary optical disc drive, the output of the front monitor diode is not sufficient to allow the optical disc drive to accurately monitor, and thereby adjust, the output of the laser diode when the laser diode is driven by such a high speed write strategy signal.

Hence, a need exists for improved methods for monitoring and controlling the irradiation power emitted by an optical disc drive laser during high speed/high density optical disc media write and optical disc media read operations.

SUMMARY

In accordance with the described optical disc drive laser power verification approach, an optical disc drive is able to accurately verify irradiation beam power levels associated with a write strategy used in high speed, high density optical disc media formats such as HD DVD and Blu-Ray, using a front monitor diode with a relatively slow rise time and/or relative slow fall time compared to the frequency, or clock cycle time, of the write strategy signal. The approach may be used during high speed write operations without adversely affecting the data storage capacity and/or integrity of the stored data.

Using the described approach, data to be written to an optical disc media may first be grouped into data blocks and error correction codes maybe generated for the respective data blocks. Next, a selected number of the data blocks and respective BCC codes may be interleaved to create a buffer of ECC/interleaved data. Each buffer of BCC/interleaved data may then encoded using, for example, NRZ encoding, and a portion of the encoded data may overwritten to include a predetermined data pattern that corresponds to a write power level associated with the write strategy, i.e., the process used to convert the encoded data to a write strategy signal with a greater time resolution and a predetermined number of write power levels, selected to write the encoded data to the selected optical disc media. During write strategy processing of the encoded data, the predetermined data pattern in the encoded data may be identified and in place of applying the write strategy to the placed data pattern, thereby resulting in high frequency pulsed output, a constant write strategy power level associated with the data pattern may be placed within the write strategy output. The constant write strategy output placed within the write strategy signal may control the optical disc drive laser to emit a constant irradiation beam for a duration corresponding to the number of bits overwritten by the predetermined data pattern and may be sufficiently long to allow the front monitor diode to obtain an accurate measure of the irradiation beam power level.

According to at least one embodiment of the described optical disc drive laser power verification approach, the number of data patterns placed within an encoded data may vary depending on the selected write strategy. For example, if the write strategy uses two write power levels, e.g., a HIGH write power level and a LOW write power level, then a separate data pattern may be placed in the encoded data stream to verify the laser power output generated by the disc drive laser in response to each of the respective write strategy power levels.

According to another embodiment of the described optical disc drive laser power verification approach, the length of each data pattern placed within the encoded data may be dynamically determined based on a number of factors such as the rise time and fall time of the front monitor diode used to measure the laser power level, the pulse frequency of the selected write strategy, the selected encoding strategy, and the selected interleaving and error correction techniques. As a result, the length of the data pattern used to overwrite portions of an encoded data buffer may vary for different optical disc drive hardware/software configurations, so long as the period of time that the laser power level is held constant at a respective write strategy power level in response to a predetermined data pattern is sufficiently long to allow the optical disc drive front monitor diode to obtain an accurate measure of the power level of the irradiation beam.

According to at least one embodiment of an optical disc drive that uses the described laser power verification approach, the optical disc drive may be dynamically configurable to support read/write operations from/to a multiple optical disc media types. Such a dynamically configurable optical disc drive may be capable of dynamically adjusting one or more of the spindle motor rotational speed, stepping motor speed and step increment, error correction code techniques, interleaving/de-interleaving techniques, encoding/decoding techniques, write strategies, and/or laser power level control parameters to support read/write operations from/to the multiple optical disc media types supported. In such an optical disc drive, the number, bit-length and content of data patterns that may be overwritten within an encoded data buffer to support the described laser power verification approach may be dynamically adjusted based on predetermined stored control parameters, to assure that the front monitor diode is provided the opportunity to provide accurate measures of the optical disc drive's laser output for write strategy power levels associated with each of the respective configurations supported by the optical disc drive.

According to at least one embodiment of the described optical disc drive laser power verification approach, the position of the data pattern within the encoded data buffer and/or the length of the placed data pattern may be adjusted within a predetermined range to minimize the impact of the placed data pattern on the non-overwritten portions of the encoded data. For example, the length and/or position of the placed data pattern may be adjusted to avoid overwriting synchronization patterns within the encoded data and/or to avoid introducing run-length errors, in the non-overwritten data.

Further, depending on the characteristics of the front monitor diode and the optical disc media and formatting techniques for which a optical disc drive has been configured, the length of the data pattern used to overwrite portions of the encoded data may vary. The length of the placed data pattern may be determined by the incremental duration that each bit in the placed data pattern contributes to the total duration of the constant laser power output produce by the disc drive laser in response to the placed data pattern, and the duration required by the front monitor diode to achieve an accurate measure of the irradiation beam power level. For example, data patterns with a length of approximately 20-30 bits, or 20T to 30T, may be sufficient for the front monitor diodes to achieve an accurate measure of the laser power output.

Table 1, below, provides approximate lengths of physical optical disc media linear recording space required to physically record an encoded data string of 20T and 30T for several type of optical disc formats. For example, a data pattern of 20T requires 2.66 um of linear disc space and a data pattern of 30T requires 4 um of linear disc space. Fortunately, such a loss of stored data is no greater than the loss of data that may be that may be caused by a small scratch or chip in the surface of an optical disc media. Such a loss of data may be easily addressed by existing error code correction and interleaving techniques,

TABLE 1

| Format | 20T | 30T |
| --- | --- | --- |
| DVD | 2.66 um | 4 um |
| HD | 2.04 um | 3.06 um |
| BD | 1.49 um | 2.23 um |

One example embodiment of the described optical disc drive may include an encoder module that generates encoded write data and overwrites a portion of the encoded write data with a predetermined data pattern, a strategy module that generates a write strategy signal based on the encoded write data, the predetermined data pattern in the encoded write data being replaced with a constant pulse, a laser driver that drives an optical disc drive laser based on the generated write strategy signal and a power level control signal to emit an irradiation beam with a controlled intensity level, a front monitor diode that measures an intensity of the irradiation beam driven by the constant pulse portion of the write strategy signal and the power control signal, and a laser power control module that updates the power level control signal based on a difference between the measured irradiation beam intensity and a target irradiation beam intensity.

One example embodiment of the described method of controlling an intensity of an irradiation beam emitted by an optical disc drive laser may include overwriting a portion of an encoded write data with a predetermined data pattern, generating a write strategy signal based on the encoded write data, the predetermined data pattern in the encoded write data being replaced with a constant pulse, driving an optical disc drive laser based on the generated write strategy signal and a power level control signal to emit an irradiation beam with a controlled intensity level, measuring an intensity of the irradiation beam driven by the constant pulse portion of the write strategy signal and the power control signal, and updating the power level control signal based on a difference between the measured irradiation beam intensity and a target irradiation beam intensity.

One example embodiment of the described method of measuring an intensity of an irradiation beam emitted by an optical disc drive laser may include, overwriting a portion of a write strategy signal with a constant value, driving an optical disc drive laser based on the write strategy signal and a power level control signal to emit an irradiation beam with a controlled intensity level, and measuring an intensity of the irradiation beam driven by the constant value portion of the write strategy signal and the power level control signal.

BRIEF DESCRIPTION OF THE DRAWINGS

Example embodiments of optical disc drives that include approaches for performing forward sense sampling of laser power based on data patterns included within data written to an optical disc media will be described with reference to the following drawings, wherein like numerals designate like elements, and wherein.

DETAILED DESCRIPTION OF EMBODIMENTS

Figure 1:
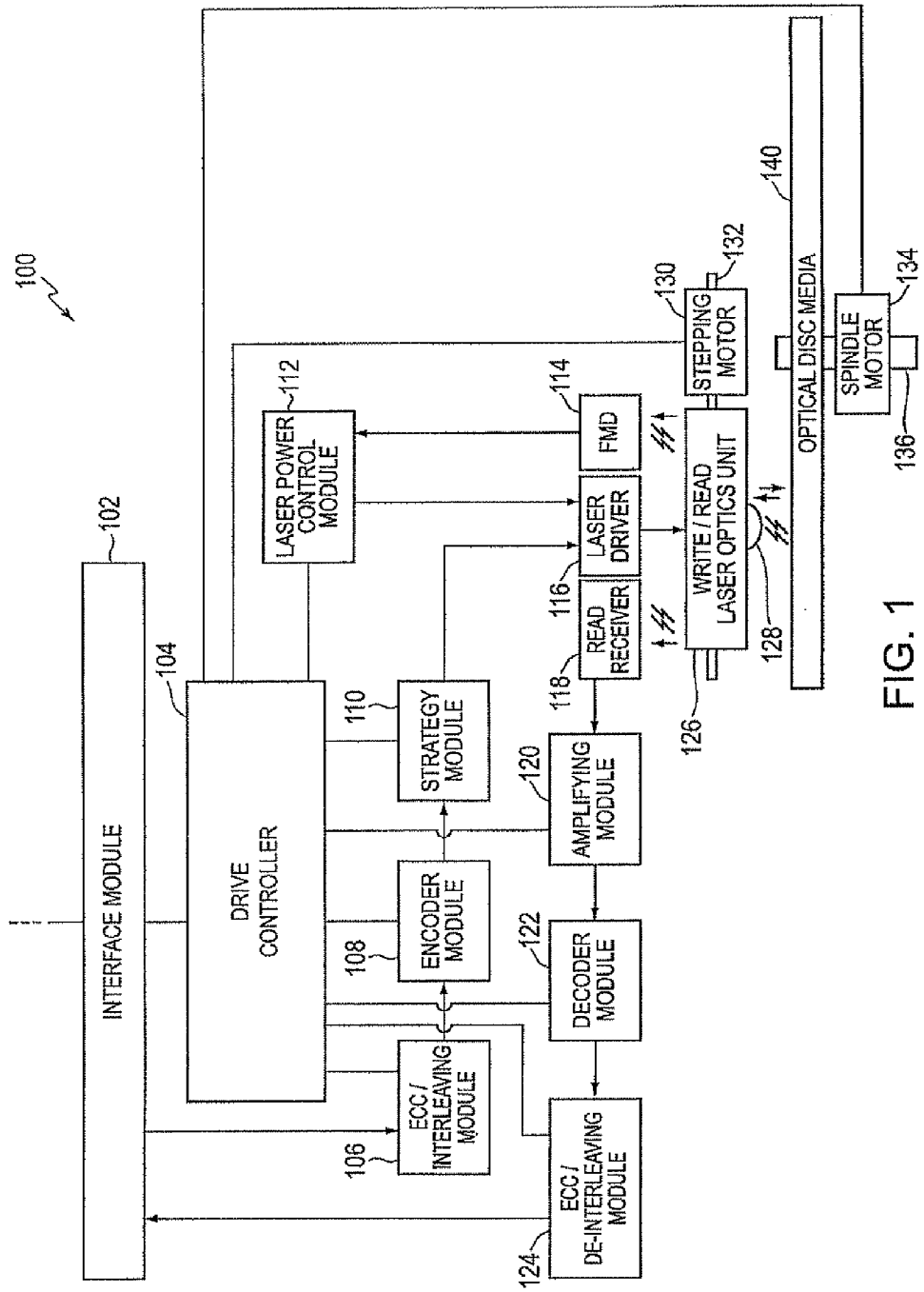
FIG. 1 is a block diagram of an example of an optical disc drive that performs forward sense sampling of laser power based on data patterns included within data written to an optical disc media.

FIG. 1 is a block diagram of an example of an optical disc drive that performs forward sense sampling of laser power based on patterns placed within data written to an optical disc media. As shown in FIG. 1, optical disc drive 100 may include an interface module 102, a drive controller 104, an error correction code (ECC)/interleaving module 106, an encoder 108, a strategy module 110, a laser power control module 112, a front monitor diode (FMD) 114, a laser driver 116, a read receiver 118, an amplifying module 120, a decoder module 122, an ECC/de-interleaving module 124, a write/read laser optics unit 126, a stepping motor 130, and a spindle motor 134.

As further shown in FIG. 1, drive controller 104 may be connected to and may communicate with interface module 102, ECC/interleaving module 106, encoder 108, strategy module 110, laser power control module 112, amplifying module 120, decoder module 122, and ECC/de-interleaving module 124; strategy module 110 may further communicate with laser driver 116; laser driver 116 may communicate with write/read laser optics unit 126; laser power control module 112 may further communicate with laser driver 116 and front monitor diode 114; and read receiver 118 may communicate with amplifying module 120. In addition, write/read laser optics unit 126 may be mechanically driven by stepping motor 130 via stepping motor drive shaft 132, and an optical disc media 140 may be mechanically driven by spindle motor 134 via spindle motor drive shaft 136.

In operation, drive controller 104 may communicate via interface module 102 with a remote processing device, or data source, not shown, such as, for example, personal computer, workstation or other device configured to support the writing of data to an optical disc media via optical disc drive 100. In one example embodiment, drive controller 104 may receive via interface module 102 from the remote processing device during an installation process, configuration and control parameters that drive controller 104 may store in a local data store, e.g., read once memory (ROM), random access memory (RAM) memory or static RAM, for later use in controlling optical disc drive 100. In another example embodiment, drive controller 104 may be pre-configured with configuration and control parameters stored in a local data store, e.g., ROM memory, for use in controlling optical disc drive 100. In one exemplary embodiment, the configuration and control parameters stored by drive controller 104 may be dynamically loaded from local memory, as needed, thereby allowing optical disc drive 100 to be used to support read/write operations for a wide range of optical disc media, as described in greater detail below.

In response to a write request received, via interface module 102, from a data source, drive controller 104 may initialize ECC/interleaving module 106, encoder 108, strategy module 110, and laser power control module 112 to support a write operation. Subsequently received write buffers received via interface module 102 in association with the write request may bypass drive controller 104 and may be received directly by ECC/interleaving module 106. ECC/interleaving module 106 may store the write buffers, apply one or more error correction codes and data interleaving, and may pass the ECC/interleaving formatted buffer to encoder module 108. Encoder module 108 may encode the received ECC/interleave formatted buffer to produced an encoded buffer, as described in greater detail below with respect to FIG. 4 and FIG. 8, and may pass the encoded buffer to strategy module 110. Strategy module 110 may apply a write strategy to convert the received encoded data, which may also be referred to as binary non-return-to-zero (NRZ) data, to a signal with a higher time resolution and multiple power levels, and may pass the write strategy signal to laser driver 116. Laser driver 116 may use the write strategy signal to drive a write laser in write/read laser optics unit 126, the light from which may be focused by one or more lenses 128 onto optical disc media 140, thereby allowing the data represented by the write strategy signal to be recorded on the optical disc media. During the laser write process, optical disc media may be rotated about a central axis by spindle motor 136, and write/read laser optics unit 126 may be controllably stepped in a radial direction across the optical disc media, thereby allowing the write strategy signal to be recorded as data marks, or data pits, i.e., burned areas on the optical disc media, and spaces, i.e., non-burned areas on the optical disc media, arranged in a contiguous circular spiral pattern on optical disc media 140.

As shown in FIG. 1, the power used by laser driver 116 to drive the generation of write laser pulses produced by write/read laser optics unit 126 in response to a write strategy signal received from strategy module 110, may be controlled by laser power control module 112. Further, laser power control module 112 may receive a feedback signal from front monitoring diode 114 that corresponds to an actual intensity of the laser write signal emitted from write/read laser optics unit 126 in response to one or more power levels. Laser power control module 112 may use such feedback to dynamically adjust the power control signal supplied to laser driver 116 for the respective write strategy power levels, as described in greater detail below with respect to FIG. 6 and FIG. 10.

In response to a read request received via interface module 102, drive controller 104 may initialize amplifying module 120, decoder 122 and ECC/de-interleaving module 124 to support a read operation. Further, drive controller 104 may instruct laser power control module 112 to instruct laser driver 116 to drive write/read laser optics unit 124 to emit a read laser at a predetermined power level. Light from the read laser emitted by write/read laser optics unit 126 may be reflected from the data marks and spaces of an optical disc media upon which data was previously stored, and picked up by read receiver 118. Read receiver 118 may generate an electrical signal based on the received light reflected from an optical disc media 140, which may be amplified and converted to an encoded data stream by amplifying module 120, e.g., a data stream in encoded NRZ format, which may be passed to decoder module 122. Decoder module 122 may convert the received encoded data stream to a decoded data stream by removing the encoding applied by encoder module 108 and may pass the decoded data stream to ECC/de-interleaving module 124. ECC/de-interleaving module 124 may collect the decoded data stream into data buffers, may de-interleave the interleaved data buffers to retrieve non-interleaved write data blocks and error correction codes, may correct any errors detected in the non-interleaved write data blocks using the error correction codes, and may pass the reconstituted, error-corrected data to a data sink via interface 102.

Please note that different embodiments of optical disc drive 100 may be configured to support writing to, and reading from, one or more types of optical disc media e.g., compact disc recordable (CD-R), compact disc read-only memory (CD-ROM), compact disc-rewritable (CD-RW), compact disc write-once (CD-WO), compact disc recordable and erasable (CD-RE), digital versatile disc (DVD), high-definition digital versatile disc (HD DVD), blu-ray disc (BD), that use one or more data formatting techniques. For example, at least one embodiment of optical disc drive 100 may be configured to support writing to, and reading from, one or more types of optical disc media using one or more data formatting techniques. Based on the type of data to be stored and the type of optical disc media being written to, or read from, different formatting techniques may require the use of different operating parameters which may include, but are not limited to different laser power strengths, different write strategies, different encoding techniques, different decoding techniques, different ECC techniques, different spindle motor speeds and different stepping motor speeds and/or step increments. Therefore, embodiments of optical disc chive 100 may allow drive controller 104 to dynamically reconfigure the components of optical disc drive 100 based on stored control parameters to support one or more different operating characteristics.

For example, based on the optical disc media and/or write format requested by a write source via interface 102, drive controller 104 may configure laser power control module 112 and write strategy module 110 to control laser driver 116 to support several different levels of laser power. Drive controller 104 may assure that the desired levels of laser output are achieved and maintained throughout the write process based on feedback provided by front monitoring diode 114 to laser power control module 112 with respect to the actual power of light emitted from write/read laser optics unit 126 with respect to each specific write strategy power level, as described in greater detail below with respect to FIG. 7 and FIG. 10.

Figure 2:
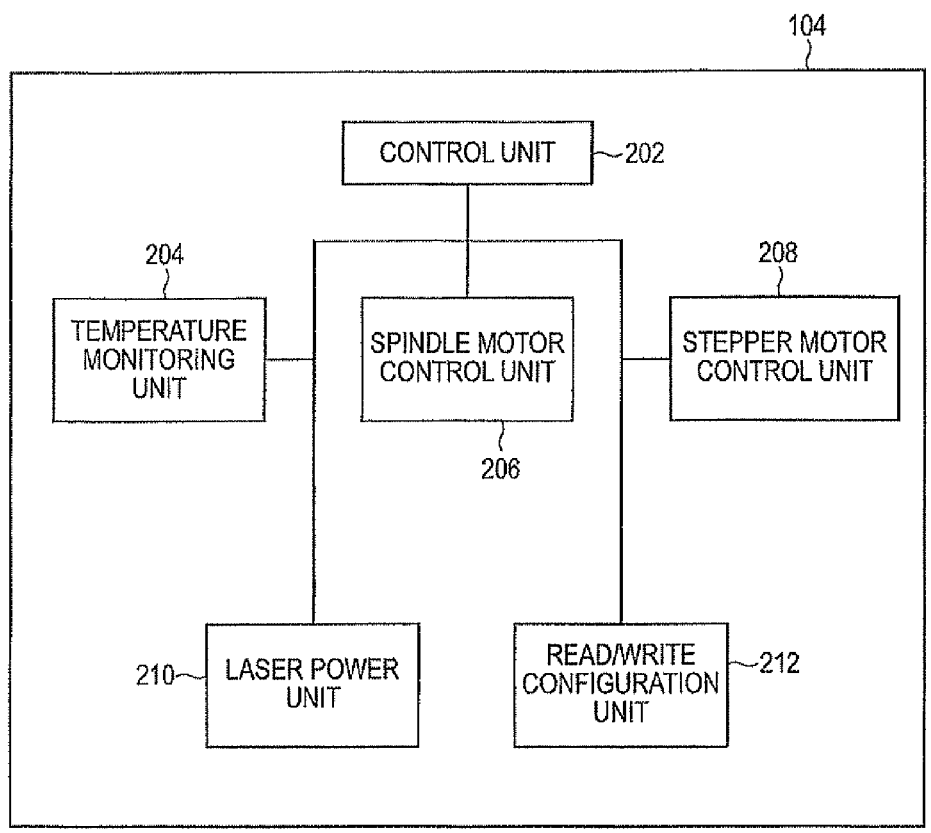
FIG. 2 is a detail block diagram of the example drive controller shown in FIG. 1.

FIG. 2 is a block diagram of an example embodiment of drive controller 104 described above with respect to FIG. 1. As shown in FIG. 2, drive controller 104 may include a control unit 202 in communication with a temperature monitoring unit 204, a spindle motor control unit 206, a stepper motor control unit 208, a laser power unit 210 and a read/write configuration unit 212. Control unit 202 may control all operations performed by drive controller 104, described above with respect to FIG. 1. In addition to communicating with the modules shown in FIG. 2, control unit 202 may control either directly or indirectly all the modules described above with respect to FIG. 1 as communicating with drive controller 104. For example, control unit 202 may control operation of stepper motor 130 via stepper motor control unit 208; control unit 202 may control operation of spindle motor 134 via spindle motor control unit 206; and control unit 202 may control operation of laser power control module 112 via laser power unit 210.

Read/write configuration unit 212 may store configuration data and control parameters that may be used by control unit 202 to configure and control operation of the respective optical disc drive modules, e.g., error correction code (ECC)/interleaving module 106, encoder 108, strategy module 110, laser power control module 112, front monitor diode 114, laser driver 116, read receiver 118, amplifying module 120, decoder module 122, ECC/de-interleaving module 124, write/read laser optics unit 126, stepping motor 130 and spindle motor 134 to support writing data to and/or reading data from one or more types of optical disc media using formats that include one or more ECC correction techniques, data interleaving techniques, data encoding techniques and write strategies. Laser power unit 210, an example embodiment of which is described in greater detail below with respect to FIG. 3, may be configured with parameters stored in read/write configuration unit 212 to verify and control the amount of light energy emitted from write/read laser optics unit 126 in response to power levels associated with one or more predefined write strategies. Spindle motor control unit 206 may be configured with parameters stored in read/write configuration unit 212 to control operation of spindle motor 134, e.g., speed of rotation, etc., to support writing to and/or reading from one or more types of optical disc media using one or more read/write data formats. Stepping motor control unit 208 may be configured with parameters stored in read/write configuration unit 212 to control operation of stepping motor 1330, e.g., step speed, step distance, etc., to support writing to and/or reading from one or more types of optical disc media using one or more read/write data formats. Temperature monitoring unit 204 may provide control unit 202 with temperature information of components within optical disc drive 100 that may be used by control unit 202 in controlling the dynamic operation of optical disc drive 100.

In operation, control unit 202 may initialize each of temperature monitoring unit 204, a spindle motor control unit 206, a stepper motor control unit 208, and laser power unit 210 with initial configuration parameters retrieved from read/write configuration unit 212 based on the type of optical disc media to be written to or read from and/or the type of data formatting used to write/read to/from the optical disc media. Once initialized, spindle motor control unit 206, a stepper motor control unit 208, and laser power unit 210 may operate independently from control unit 202, but may receive command and control parameter updates from control unit 202 in responses to changes in operating conditions, such as, for example, changes in internal device operating temperatures reported by temperature monitoring unit and/or changes in the write/read format to be used to control write/read operations to the optical disc media due to, for example, changes in the physical optical disc media and/or formatting instructions received from a write data source via the optical disc drive interface module.

Figure 3:
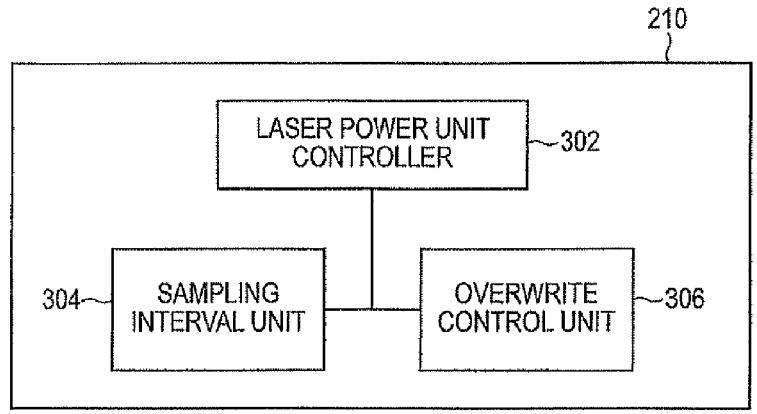
FIG. 3 is a detail block diagram of the example laser power unit shown in FIG. 2.

FIG. 3 is a block diagram of an example embodiment of laser power unit 210 described above with respect to FIG. 2. As shown in FIG. 3, laser power unit 210 may include a laser power unit controller 302, a sampling interval unit 304 and an overwrite control unit 306. Laser power unit controller 302 may communicate with control unit 202 to receive control parameters that may be used for monitoring and controlling laser power output used to write to an optical disc media in compliance with a selected write strategy and/or to read from an optical disc media that has been written to using an identified write strategy. Sampling interval unit 304 may set one or more power level verification timers that may be used to initiate a sampling of the laser irradiation beam power levels emitted in association with one or more predetermined power levels associated with the current write strategy, as described in greater detail below with respect to FIG. 7. Overwrite control unit 306 may initiate a sampling of the laser energy in response to a power level verification timeout. For example, upon expiration of a power level verification timer associated with a write strategy power level, overwrite control unit 306 may send to encoder module 108, strategy module 110, and laser power control module 112, a power level verification request. The power level verification request may identify one or more power levels to be verified/corrected, as described in greater detail below with respect to FIG. 7.

Figure 4:
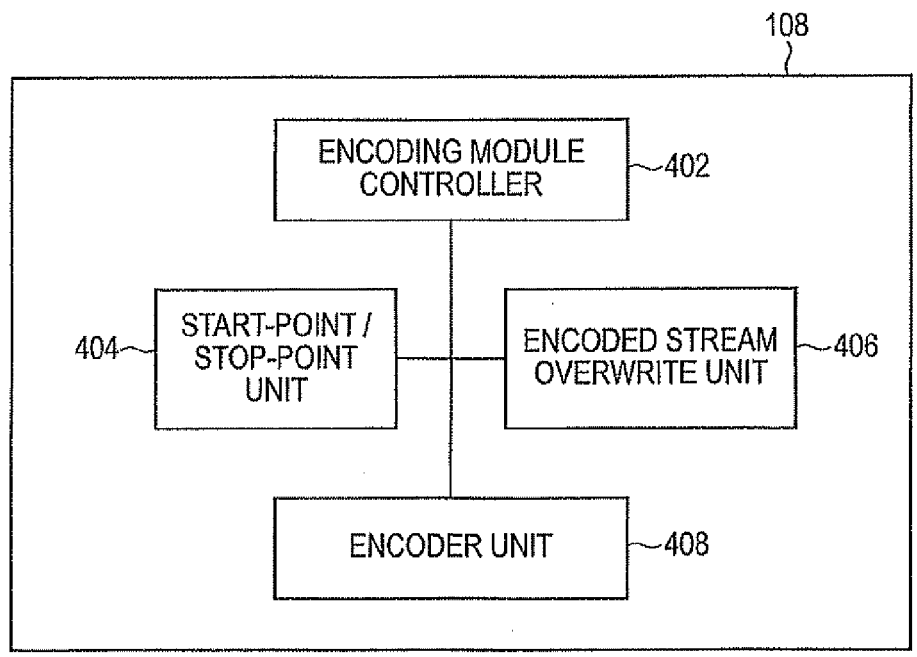
FIG. 4 is a detail block diagram of the example encoder module shown in FIG. 1.

FIG. 4 is a block diagram of an example embodiment of encoding module 108 described above with respect to FIG. 1. As shown in FIG. 4, encoding module 108 may include an encoding module controller 402, a start-point/stop-point unit 404, an encoded stream overwrite unit 406 and encoder unit 408. Encoding module controller 402 may communicate with control unit 202 to receive control parameters that may be used for controlling encoding operations in accordance with a selected encoding format and for controlling the placement of data patterns within an outgoing data stream in support forward sense sampling of laser power. Encoding unit 408 may receive and encode ECC/interleaved data buffers in accordance with an encoding strategy, e.g., NRZ, for example, based on control parameters received from encoding module controller 402. Start-point/stop-point unit 404 may remain dormant during the majority of processing performed by encoder module 108. However, in response to a power level verification request received via encoding module controller 402 from laser power unit 210, start-point/stop-point unit 404 may assess an encoded data stream produced by encoder unit 408 to identify an overwrite start-point and an overwrite stop-point within the encoded data stream which, if overwritten, would result in a placed data pattern that complies with control parameters, for example, received via encoding module controller 402 from laser power unit 210, defining a legitimate overwrite location. Encoded stream overwrite unit 406 may also remain dormant during the majority of processing performed by encoder module 108. However, in response to a power level verification request, for example, received via encoding module controller 402 from laser power unit 210, encoded stream overwrite unit 406 may overwrite the portion of the encoded buffer identified by start-point/stop-point unit 404 with a start-point and a stop-point, with a predefined data pattern associated with a write strategy power level, based on control parameters received, for example, via encoding module controller 402 from laser power unit 210.

Figure 5:
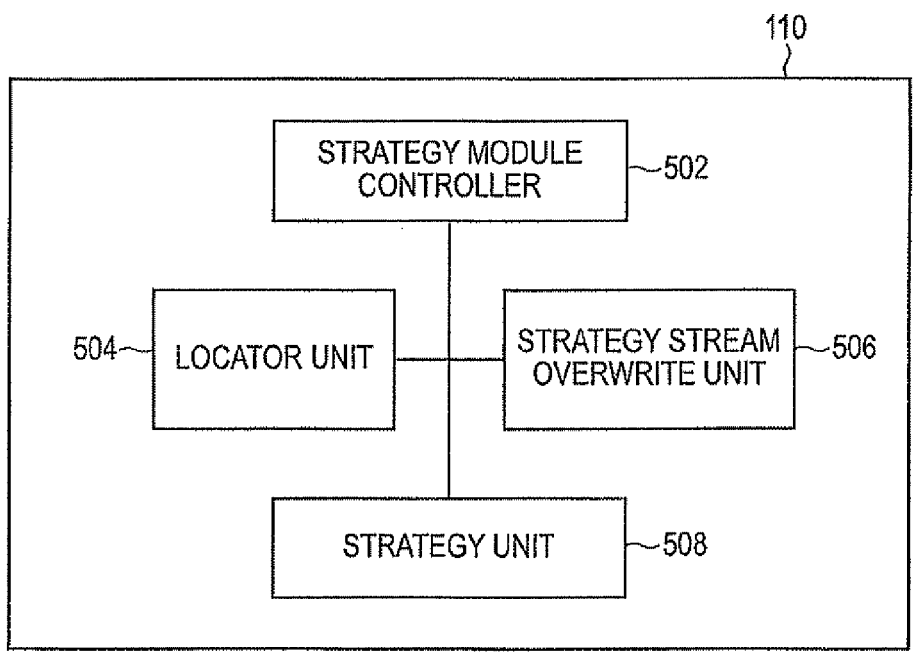
FIG. 5 is a detail block diagram of the example strategy module shown in FIG. 1.
Figure 6:
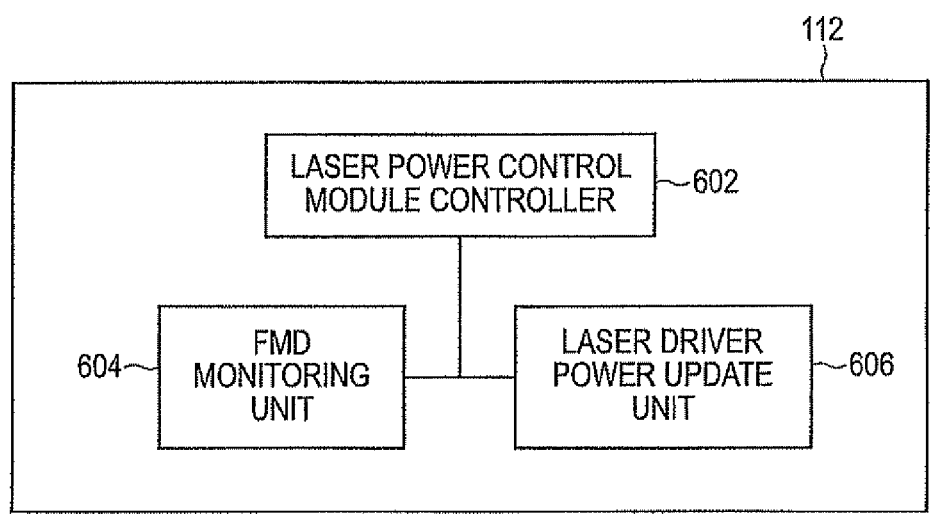
FIG. 6 is a detail block diagram of the example laser power control module shown in FIG. 1.

FIG. 5 is a block diagram of an example embodiment of strategy module 110 described above with respect to FIG. 1. As shown in FIG. 5, strategy module 110 may include a strategy module controller 502, a locator unit 504, a strategy stream overwrite unit 506 and a strategy unit 508. Strategy module controller 502 may communicate with control unit 202 to receive control parameters that may be used for controlling write strategy operations in accordance with a selected write strategy format and for controlling the placement of patterns within an outgoing write strategy signal in support forward sense sampling of laser power. Strategy unit 508 may receive encoded data from encoder module 108 and may apply a predetermined write strategy based, for example, on control parameters received, for example, via strategy module controller 502 from laser power unit 210. Locator unit 504 may remain dormant during the majority of processing performed by strategy module 110. However, in response to a power level verification request received via strategy module controller 502 from laser power unit 210, locator unit 504 may, locate within a received encoded data stream received from encoder module 108 the portion of the encoded buffer overwritten by encoded stream overwrite unit 406. Strategy stream overwrite unit 506 may also remain dormant during the majority of processing performed by strategy module 110. However, in response to a power level verification request received, for example, via strategy module controller 502 from laser power unit 210, strategy stream overwrite unit 506 may overwrite the portion of the outgoing write strategy signal identified by locator unit 504, with a constant value corresponding to a write strategy write level associated with a data pattern based on data received, for example, via strategy module controller 502 from laser power unit 210, FIG. 6 is a block diagram of an example embodiment of laser power control module 112 described above with respect to FIG. 1. As shown in FIG. 6, laser power control module 112 may include a laser power control module controller 602, an FMD monitoring unit 604, and a laser driver power update unit 606. Laser power control module controller 602 may communicate with control unit 202 to receive control parameters that may be used for controlling laser power validation and correction operations using the forward sense sampling of laser power techniques described below. FMD monitoring unit 604 may remain dormant during the majority of processing performed by optical disc drive 100, ignoring input received from front monitor diode 114. However, in response to a power level verification request received, for example, via laser power control module controller 602 from laser power unit 210, FMD monitoring unit 604 may proceed to monitor and record the measured laser power output reading produced by front monitor diode 114 during a time period in which the laser driver 116 is driven by the overwritten portion of the generated write strategy signal generated by strategy module 110. FMD monitoring unit 604 may provide the laser output value measured for the overwritten portion of the write strategy signal to laser power control module controller 602, which may compare the measured laser output power with an expected laser power received, for example, via laser power control module controller 602 from laser power unit 210. Laser power control module controller 602 may determine a difference between the measured laser power and the expected laser power and if the difference exceeds an allowed threshold value, may instruct laser driver power update unit 606 to generate a new laser power level control parameter for the write strategy power level. Laser driver power update unit 606 may generate and provide the new laser power level control parameter to laser driver 116 to control the magnitude of subsequent laser emissions for the corresponding write strategy power level.

Figure 7:
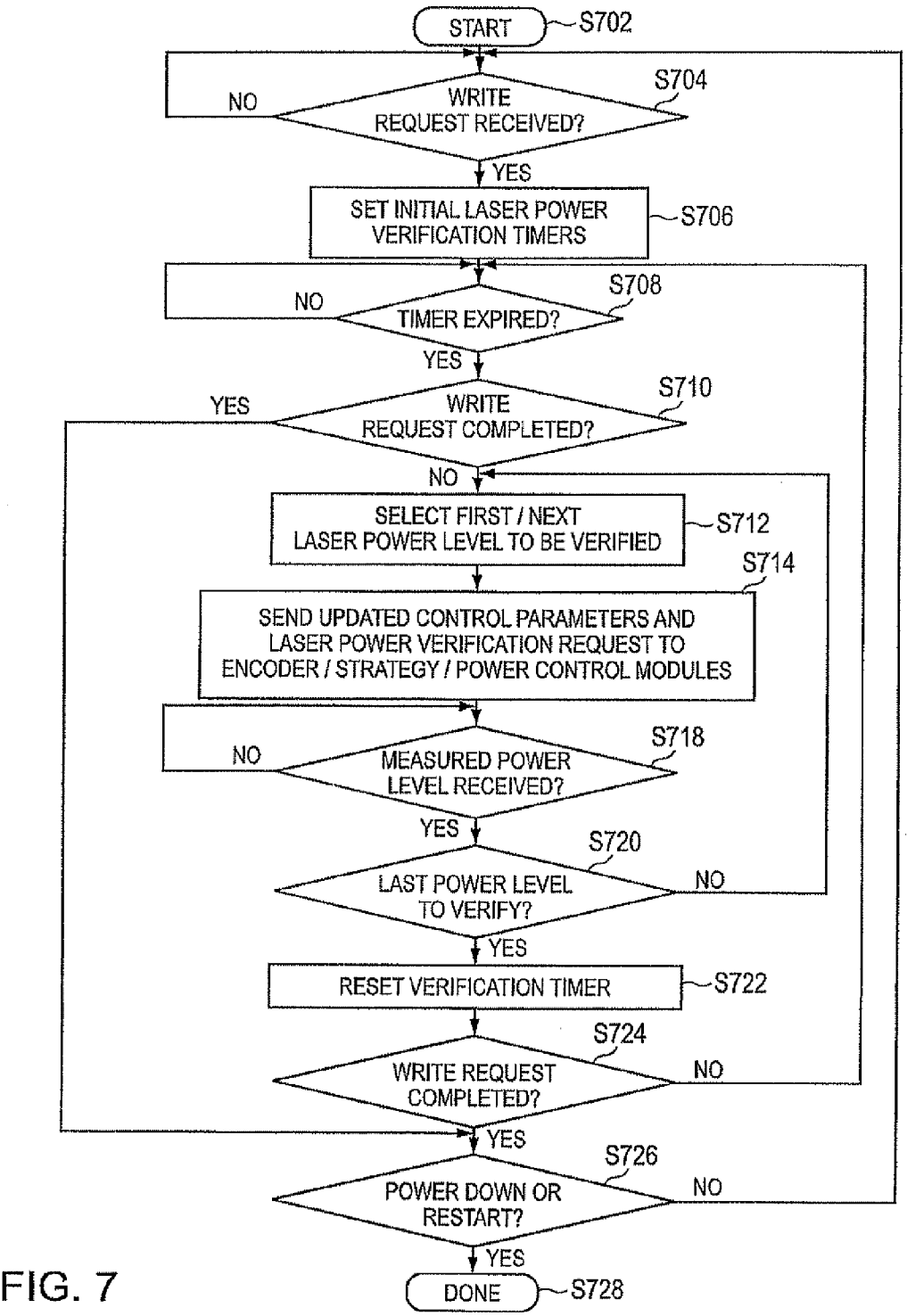
FIG. 7 shows a flow-chart of an example process for controlling the verification and correction of optical disc drive laser power.

FIG. 7 shows a flow-chart of an example process for controlling the verification and correction of optical disc drive laser power in an optical disc drive that performs forward sense sampling of laser power based on patterns placed within data written to an optical disc media. The process flow described below with respect to FIG. 7 may be executed, for example, by the laser power unit 210 within drive controller 104, as described above with respect to FIG. 2 and FIG. 3.

Please note that in the example process describe below with respect to FIG. 7 verification of power levels is initiated in response to the expiration of a power level verification timer, as described above. Depending upon the nature of the encoding format and write strategy in use, the number of timers may vary. For example, in one example embodiment, one timer may be set for each write strategy power level, e.g., which may be 2, a high power level and a low power level, if the encoding format is NRZ, and a pattern representing a single write strategy power level may be placed into the data stream and a single laser irradiation beam power level may be tested in response to an expired timer. In another example embodiment, a single timer may be used to initiate the placement of more than one pattern within the data stream. In such an embodiment, each placed pattern may be of sufficient length to allow a power level to be verified for each placed pattern.

Further, please note that in response to receiving a power level verification request from laser power unit 210 that identifies at least one write strategy power level to be verified, as described in step S714, below, each of encoder module 108, strategy module 110 and laser power control module 210 may perform actions, for example, as described below with respect to FIG. 8, FIG. 9 and FIG. 10, respectively, that result in the laser power unit receiving a measured power level, as described in step S718, below.

In one example optical disc drive, the process described below with respect to FIG. 7 may initiated in response to a write request received via interface module 102 and the process described below with respect to FIG. 7 may be executed in parallel with write operations performed in response to the write request. As shown in FIG. 7, operation of the method begins at step S702 and proceeds to step S704.

If, in step S704, the laser power unit determines that a write request has been received, operation of the method continues to step S706, otherwise the process remains at step S704.

In step S706, laser power unit 210 may initiate one or more laser power verification timers, for example, based on control parameters and definitions retrieved from read/write configuration unit 212 for the current optical disc drive configuration, and operation of the method continues to step S708.

If, in step S708, the laser power unit determines that a timer has expired, operation of the method continues to step S710, otherwise the process remains at step S708.

If, in step S710, the laser power unit determines that the write request has been completed, operation of the method proceeds to step S726, otherwise the process continues to step S712.

In step S712, the laser power unit may select a first/next laser power level associated with the expired power level verification timer, and operation of the method continues to step S714.

In step S714, the laser power unit may initiate verification of a laser power level by transmitting a laser power verification request containing at least one write strategy power level to be verified to each of the encoder module, the strategy module and the laser power control module, and operation of the method continues to step S718.

If, in step S718, the laser power unit may receive, and may store for future use as described below, a measured power level from laser power control module, operation of the method continues to step S720, otherwise the process remains at step S718.

If, in step S720, the laser power unit determines that the last power level has been verified, operation of the method continues to step S722, otherwise the process returns to step S710.

In step S722, the laser power unit may determine a new delay time, as described in greater detail below, and may reset the expired power verification timer, and operation of the method continues to step S724.

If, in step S724, the laser power unit determines that the write request has been completed, operation of the method proceeds to step S726, otherwise the process returns to step S712.

If, in step S726, the laser power unit determines that a power-down or restart has been initiated, operation of the method proceeds to step S728 and the process terminates, otherwise the process resumes at S704.

As described above with respect to step S722, the laser power unit may determine a power level verification request delay time each time the power level verification request timer is reset. In general, because the described power level verification process overwrites, i.e., destroys, data in the data stream, it is preferable for the time between verification levels be as long as possible. However, if the delay between power level verifications is too long, the laser power may fall outside of acceptable write strategy power levels and data will not be properly stored to the optical disc media. Further, the stability of an optical disc drive laser may depend on many features as the age of the laser, the temperature of the optical disc drive components, the ambient temperature, the intensity of the power level, etc. In addition, past stability of the laser optical disc drive laser may also be helpful in determining a future stability of the laser. Therefore, control parameters received by laser power unit 210, for example, from read/write configuration unit 212, may be used to initially configure laser power unit and may include a maximum power level verification request delay for each power level supported by the write strategy. However, laser power unit 210 may dynamically reduce the maximum delay based one or more of, past deviations of the irradiation beam power at the respective write strategy power levels, e.g., based on past power levels measured by laser power control module 212 and provided to, and stored by, laser power unit 210, as described above with respect to FIG. 7 and below with respect to FIG. 10, the temperature of one or more components within the optical disc drive, e.g., received from temperature monitoring unit 204, the write strategy pulse frequency/data density, and/or other factors that may increase the risk of instability in the irradiation beam power level.

Figure 8:
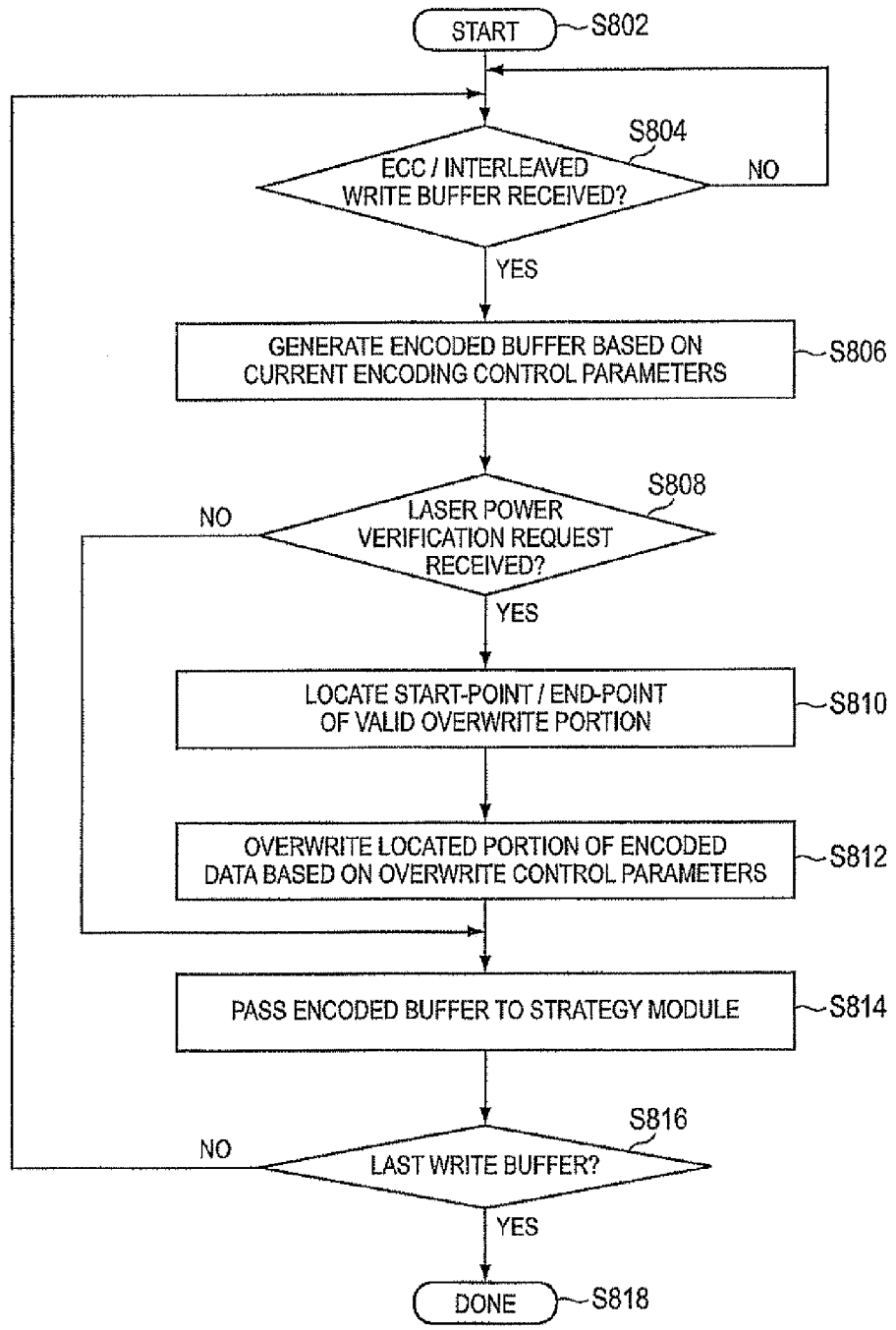
FIG. 8 shows a flow-chart of an example process for controlling the placement of a data pattern within an encoded write buffer.

FIG. 8 shows a flow-chart of an example process for controlling the placement of a predetermined data pattern within an encoded write buffer in an optical disc drive that performs forward sense sampling of laser power based on patterns placed within data written to an optical disc. The process flow described below with respect to FIG. 8 may be executed, for example, by the encoder module 108 within optical disc drive 100, described above with respect to FIG. 1 and FIG. 4. The process described below with respect to FIG. 8 may be executed in parallel with the process described above with respect to FIG. 7 and both processes may be initiated by drive controller 104 in response to a write request from a remote data source via interface module 102. As shown in FIG. 8, operation of the method begins at step S802 and proceeds to step S804.

If, in step S804, the encoder module determines that an interleaved write buffer with ECC codes has been received from the ECC/interleaving module, operation of the method continues to step S806, otherwise the process remains at step S804.

In step S806, the encoder module may process the received interleaved write buffer with ECC codes and may generate an encoded write buffer based on the currently assigned encoding format, e.g., NRZ, and operation of the method continues to step S808.

If, in step S808, the encoder module determines that a laser power verification request has been received that identifies at least one write strategy power level to be verified, e.g., from the laser power unit as described above with respect to FIG. 7 at step S714, operation of the method continues to step S810, otherwise the process proceeds to step S814.

In step S810, the encoder module may identify a start-point and an end-point for a segment within the encoded buffer that may be overwritten, as described in greater detail below, and operation of the method continues to step S812.

In step S812, the encoder module may overwrite the selected segment with a data pattern that represents one or more power levels, as described in greater detail below, and operation of the method continues to step S814.

In step S814, the encoder module may passed the encoded buffer to the strategy module, as described above with respect to FIG. 1, and operation of the method continues to step S816.

If, in step S816, the encoder module determines that the last interleaved write buffer with ECC codes associated with the current write request has been received, operation of the method proceeds to step S818 and the process terminates, otherwise the process resumes at S804.

In one example optical disc drive embodiment, when locating a start-point and an end-point for a segment within the encoded buffer that may be overwritten, as described above at step S810, the encoder module may make a selection based on criteria received, for example, from the laser power unit of the optical disc drive controller, the criteria having been retrieved, for example, from the read/write configuration unit for the currently selected encoding format. For example, in one example embodiment, the portion of the encoded buffer to be overwritten may be selected to minimize adverse impacts on subsequent processing of the encoded data.

For example, assuming that the length and content of the placed data pattern violates a maximum code run length associated with the selected encoding technique, the encoder module may select a start-point and end-point for the overwritten segment such that the encoded data remaining on either side of the overwritten segment does not violate other rules associated with the currently selected encoding technique. For example, the start-point and end-point for the overwritten segment may be selected to avoid violating a minimum run length rule and/or to avoid overwriting synchronization codes embedded in the encoded data. For example to avoid violating a minimum run length rule the start-point and end-point for the overwritten segment may be selected such that once the segment is overwritten, no individual 1's bordered by 0's, or individual 0's bordered by 1's remain on either side of overwritten segment. For example, to avoid overwriting synchronization codes embedded in the encoded data, the start-point and end-point for the overwritten segment may be selected such that no synchronization code sequences are located between the selected start-point and the selected end-point.

Figure 11:
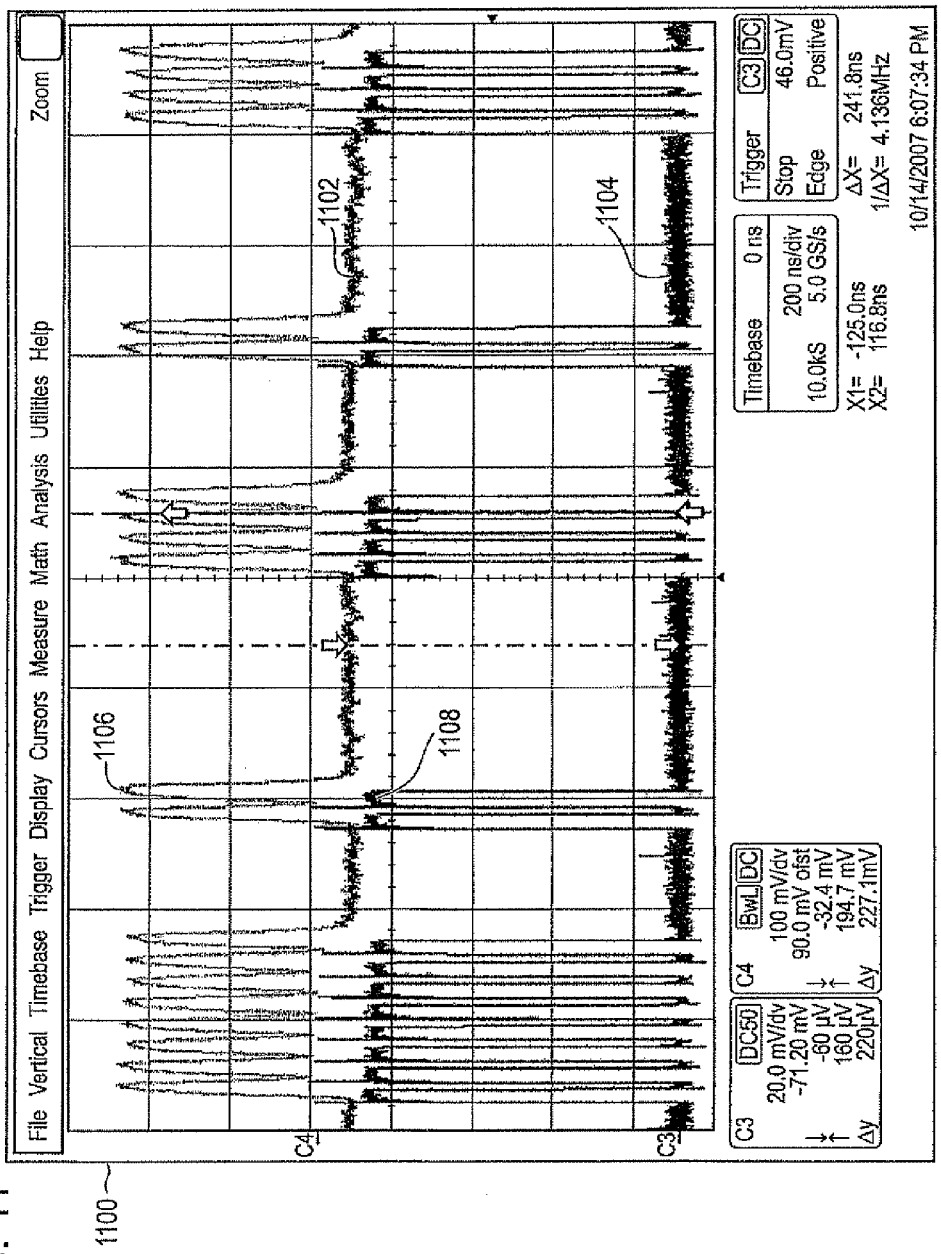
FIG. 11 shows an example of a response of a front monitor diode to a low speed write output from optical disc write laser using related art techniques.
Figure 12:
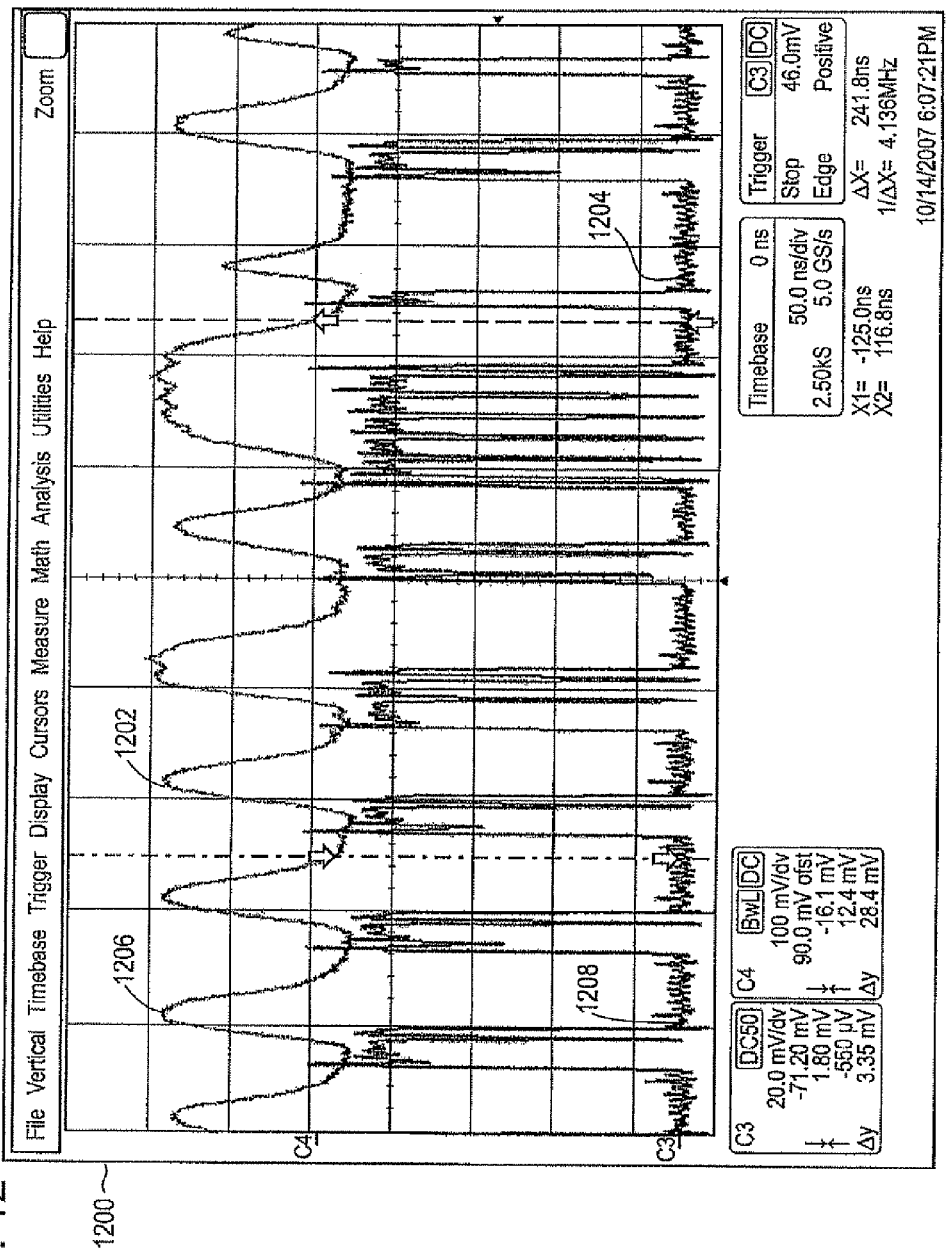
FIG. 12 shows an example of a response of a front monitor diode to a high speed write output from optical disc write laser using related art techniques.

For example, as described above with respect to FIG. 11 and FIG. 12, the required length of the overwritten data segment may vary depending on the speed of the front monitoring diode used and the speed of the write strategy format. However, in many optical disc drives overwriting a segment with a length between 20T and 30T may allow sufficient time for the FMD to provide an accurate measure of the laser output. For example, the control parameters provided to the encoding module for use in controlling the overwrite process may specify a range for the length of the overwritten segment and the encoder module may be allowed to select any start-point and end-point that results in a segment with a length within the allowed range that does overwrite control sequences, e.g., synchronization codes, and that does not introduce additional run length violations outside of the overwritten data segment. Please note that although overwriting 20T to 30T of encoded data, for example, with 30 zeros or 30 ones, may likely result in a run length error, such a loss of data may be corrected when the data is read from the optical disc media, based on the error correction codes stored with the data and the interleaving applied to the data before the data was encoded and written to the optical disc media.

In one example optical disc drive embodiment, when overwriting a data segment with a data pattern that represents one or more power levels, as described above with respect to step S812, the data pattern written may be based on control parameters received by the encoder module 108 from the laser power unit 210 of the drive controller 104, based on parameters stored in the read/write configuration unit 212 for the currently selected encoding format. For example, if an NRZ encoding format is used, and the expired laser power verification timer is associated with a single power level, e.g., a HIGH power level, the data pattern may include a string of 1's for the duration of the data pattern, and the data pattern may have a length that may allow the laser power control module to obtain an accurate measure of the laser irradiation beam power output generated in response to the write strategy HIGH write power level. Likewise, if an NRZ encoding format is used, and the expired laser power verification timer is associated with a write strategy LOW write power level, the data pattern may include a string of 0's for the duration of the data pattern, and the data pattern may have a length that may allow the laser power control module to obtain an accurate measure of the laser power output generated in response to the write strategy LOW write power level. Depending upon the allowable total length of the data pattern, i.e., the maximum data segment length that may be overwritten without introducing irrecoverable data errors, a laser power verification timer may be associated with a more than a single power level. In such an embodiment, for example, if an NRZ encoding format is used, a first data pattern with a string of 0's for the duration of the data pattern may be used to allow the laser power control module to obtain an accurate measure of the laser power output generated in response to the write strategy LOW write power level and a second data pattern with a string of 1's for the duration of the data pattern may be used to allow the laser power control module to obtain an accurate measure of the laser power output generated in response to the write strategy HIGH write power level.

Figure 9:
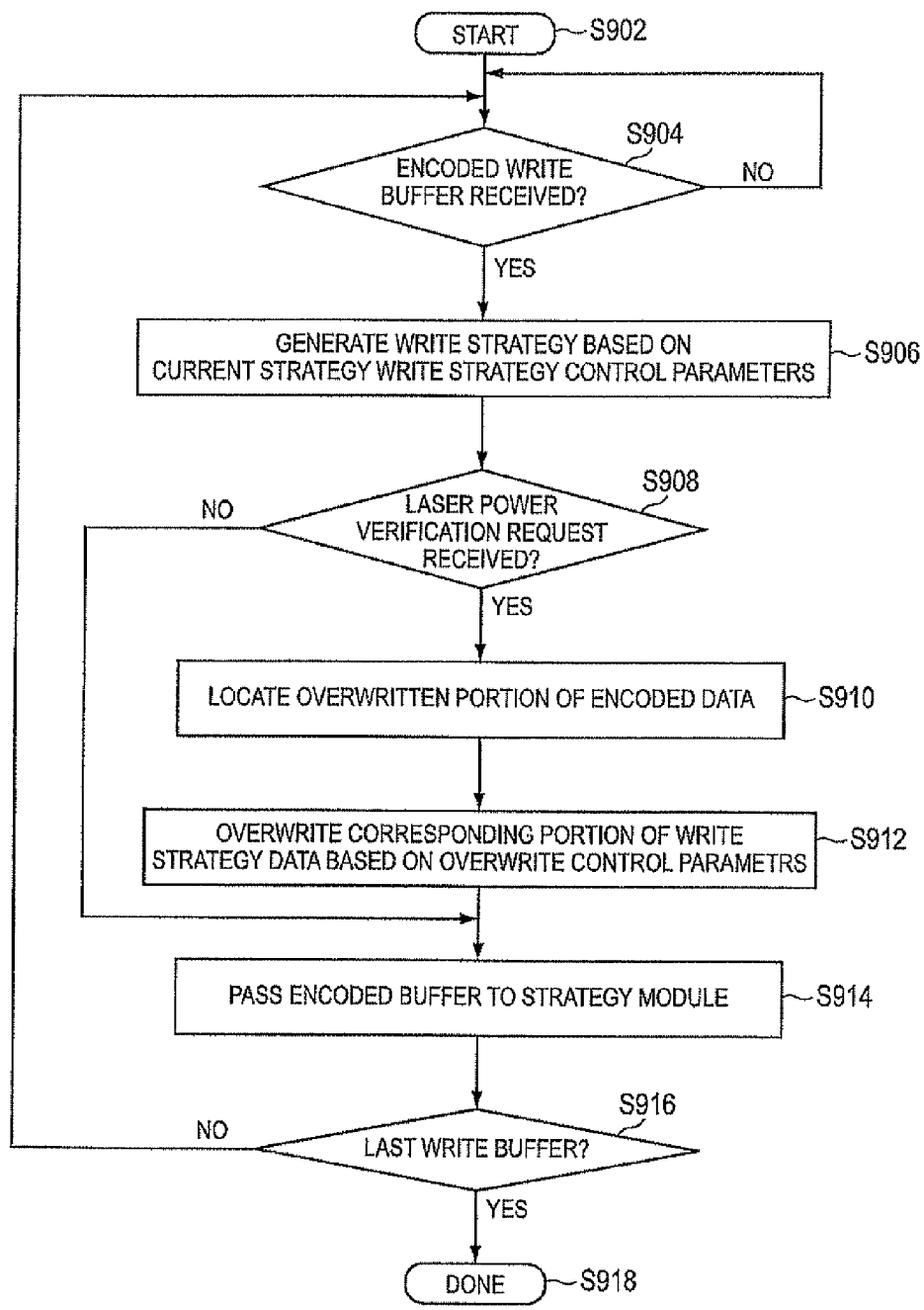
FIG. 9 shows a flow-chart of an example process for controlling the generation of a write strategy signal from an encoded write buffer modified, for example, using the process shown in FIG. 8.

FIG. 9 shows a flow-chart of an example process for controlling the overwriting of a portion of a write strategy signal in an optical disc drive that performs forward sense sampling of laser power based on patterns placed within data written to an optical disc. The process flow described below with respect to FIG. 9 may be executed, for example, by the strategy module 110 within optical disc drive 100, described above with respect to FIG. 1 and FIG. 5. The process described below with respect to FIG. 9 may be executed in parallel with the processes described above with respect to FIG. 7 and FIG. 8, and both processes may be initiated by drive controller 104 in response to a write request from a remote data source via interface module 102. As shown in FIG. 9, operation of the method begins at step S902 and proceeds to step S904.

If, in step S904, the strategy module determines that an encoded data buffer has been received from the encoder module, operation of the method continues to step S906, otherwise the process remains at step S904.

In step S906, the strategy module may process the received encoded write buffer with and may generate a write strategy signal based on the received encoded write buffer and the currently assigned write strategy and operation of the method continues to step S908.

If, in step S908, the strategy module determines that a laser power verification request has been received that identifies at least one write strategy power level to be verified, e.g., from the laser power unit as described above with respect to FIG. 7 at step S714, operation of the method continues to step S910, otherwise operation of the method continues to step S914.

In step S910, the strategy module may identify a portion of the generated write strategy signal corresponding to the data pattern placed by the encoder module, as described above with respect to FIG. 8, and operation of the method continues to step S912.

In step S912, the strategy module may overwrite the selected portion of the generated write strategy signal with a segment corresponding to a write strategy power level associated with the data pattern placed in the encoded data, and operation of the method continues to step S914.

In step S914, the strategy module may pass the write strategy signal to the laser driver 116, as described above with respect to FIG. 1, and operation of the method continues to step S916.

If, in step S916, the strategy module determines that the last encoded write buffer associated with the current write request has been received, operation of the method proceeds to step S918 and the process terminates, otherwise the process resumes at S904.

Figure 10:
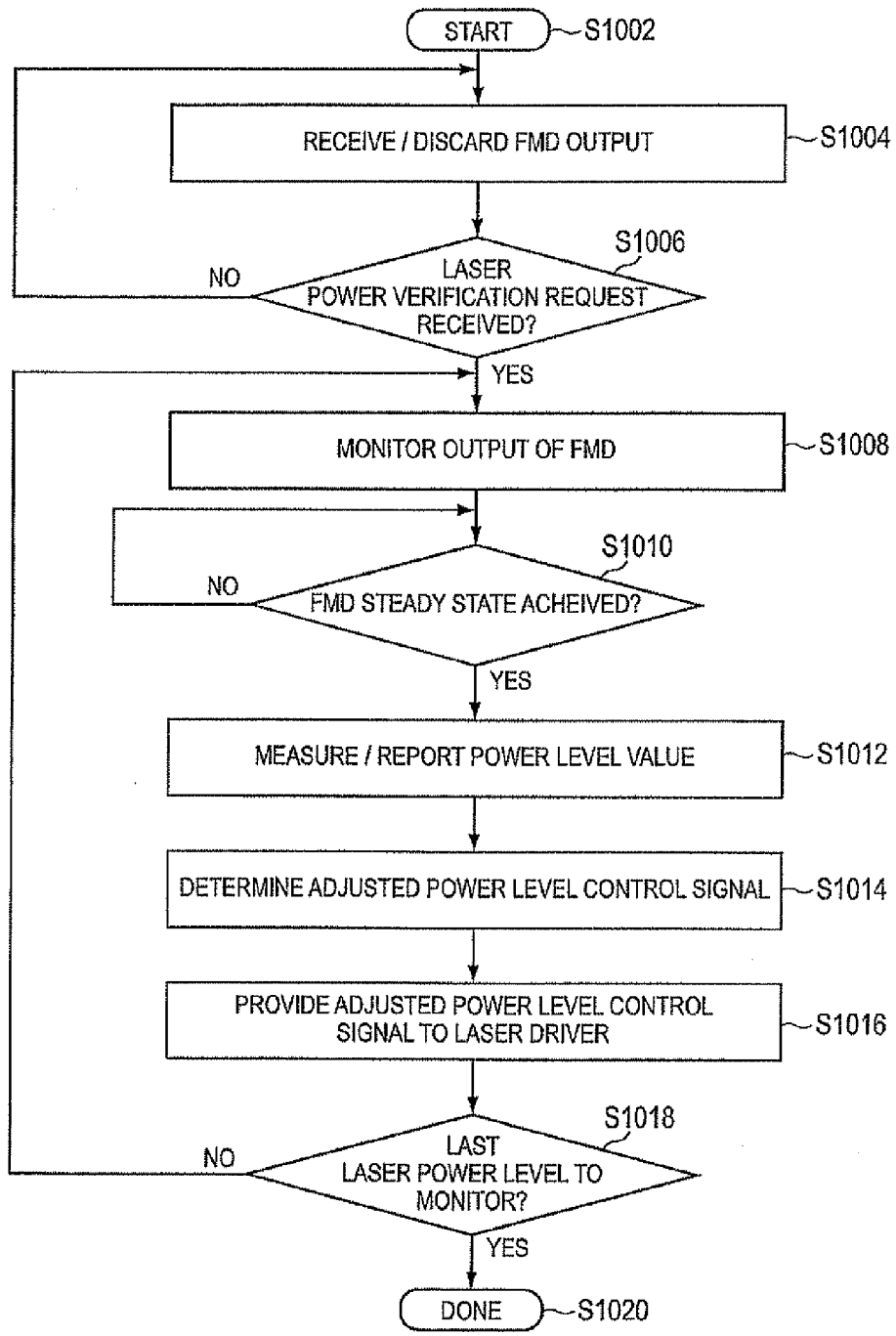
FIG. 10 shows a flow-chart of an example process for adjusting a laser power control signal based on a laser irradiation beam power level measured during the writing of the modified write strategy signal to an optical media.

FIG. 10 shows a flow-chart of an example process for adjusting a laser irradiation beam power level based on a laser power level measured during the writing of a data pattern within an optical disc media. The process flow described below with respect to FIG. 10 may be executed, for example, by the laser power control module within optical disc drive 100, described above with respect to FIG. 1 and FIG. 6. The process described below with respect to FIG. 10 may be executed in parallel with the processes described above with respect to FIG. 7, FIG. 8, FIG. 9 and all three processes may be initiated by drive controller 104 in response to a write request from a remote data source via interface module 102. As shown in FIG. 10, operation of the method begins at step S1002 and proceeds to step S1004.

In step S1004, the laser power control module may receive and discard laser power measurements received from front monitor diode 114, and operation of the method continues to step S1006.

If, in step S1006, the laser power control module determines that a laser power verification request has been received that identifies at least one write strategy power level to be verified, e.g., from the laser power unit as described above with respect to FIG. 7 at step S714, operation of the method continues to step S1008, otherwise the process returns to step S1004.

In step S1008, the laser power control module may monitor the output of the front monitoring diode, and operation of the method continues to step S1010.

If, in step S1010, the laser power control module determines that the FMD output has achieved a steady state, operation of the method continues to step S1012, otherwise operation of the method returns to step S1012.

In step S1012, the laser power control module may measure the output of the front monitoring diode and may report the measured value to laser power unit 210, as described above with respect to FIG. 7 at step S718, and operation of the method continues to step S1014.

In step S1014, the laser power control module may determine an adjusted power level control signal, e.g. based on a comparison of the measured laser power and a stored target laser irradiation beam power level value for the write strategy power level identified for verification in the received laser power verification request, and operation of the method continues to step S1016.

In step S1016, the laser power control module may provide the adjusted power level control signal to the laser driver, e.g., described above with respect to FIG. 1 at 116, in association with the verified power level, for use in controlling future laser emissions in response to write strategy pulses requesting emission of the verified write strategy power level, and operation of the method continues to step S1018.

If, in step S1018, the laser power control module determines that the last power level associated with the received power verification request has been verified, operation of the method continues to step S1020 and terminates, otherwise, operation of the method continues to step S1008.

It should be understood that the described approach for performing forward sense sampling of laser power based on patterns placed within data written to an optical disc media may be incorporated in a wide range of optical disc drives and may be adapted for use with a wide range of optical disc media write and/or read formats.

It should be understood that within an individual optical disc drive the described approach for performing forward sense sampling of laser power based on patterns placed within data written to an optical disc may be dynamically reconfigured to support forward sense sampling of laser power in association with wide range of optical disc media write and/or read formats, and that the technique may be used to support all forward sense sampling for optical disc media write and/or read formats supported by the optical disc drive by varying control parameters used to control the described process.

For purposes of explanation, in the above description, numerous specific details are set forth in order to provide a thorough understanding of the described approach for performing forward sense sampling of laser power based on patterns placed within data written to an optical disc. It will be apparent, however, to one skilled in the art that the described approach may be practiced without these specific details. In other instances, well-known structures and devices are shown in block diagram form in order to avoid obscuring the features of the described approach.

While the described approach for performing forward sense sampling of laser power based on patterns placed within data written to an optical disc media has been described in conjunction with the specific embodiments thereof, it is evident that many alternatives, modifications, and variations will be apparent to those skilled in the art. Accordingly, embodiments of described approach for performing forward sense sampling of laser power based on patterns placed within data written to an optical disc, as set forth herein, are intended to be illustrative, not limiting. There are changes that may be made without departing from the spirit and scope of the invention.

What is claimed is:

1. An optical disc drive, comprising:
   an encoder module that generates encoded write data and overwrites a portion of the encoded write data with a predetermined data pattern;
   a strategy module that generates a write strategy signal based on the encoded write data, the predetermined data pattern in the encoded write data being replaced with a constant value;
   a laser driver that drives an optical disc drive laser based on the generated write strategy signal and a power level control signal to emit an irradiation beam with a controlled intensity level;
   a front monitor diode that measures an intensity of the irradiation beam driven by the constant value portion of the write strategy signal and the power level control signal; and
   a laser power control module that updates the power level control signal based on a difference between the measured irradiation beam intensity and a target irradiation beam intensity.

2. The optical disc drive of claim 1, wherein the encoder module comprises:
   a start-point/stop-point unit that locates a portion of the encoded write data to be overwritten; and
   an encoder overwrite unit that overwrites the located portion with the predetermined data pattern.

3. The optical disc drive of claim 2, wherein the start-point/stop-point unit adjusts at least one of a length and a position of the located portion of encoded write data to be overwritten to avoid overwriting synchronization patterns within the encoded data, and wherein the encoder overwrite unit may adjust a length of the predetermined data pattern to fit the located portion of encoded write data to be overwritten.

4. The optical disc drive of claim 2, wherein the start-point/stop-point unit adjusts a length of the predetermined data pattern to avoid introducing run length errors in portions of the encoded data that are not overwritten.

5. The optical disc drive of claim 1, wherein the strategy module comprises:
   a locator unit that locates the predetermined data pattern in the encoded data; and
   a strategy overwrite unit that overwrites the predetermined data pattern in the encoded write data with, a constant write strategy value that corresponds to a write strategy power level.

6. The optical disc drive of claim 1, wherein the predetermined data pattern violates an encoded data run length.

7. The optical disc drive of claim 1, wherein the encoded data is in an NRZ format.

8. The optical disc drive of claim 1, wherein the laser power control module further comprises:
   a front monitor diode monitoring unit that stores the intensity of the irradiation beam measured by the front monitor diode when the laser is driven by a constant write strategy value that corresponds to a write strategy power level; and
   a power update unit that determines a difference between the measured irradiation beam intensity and the target irradiation beam intensity and updates the power level control signal for the write strategy power level based on a determined difference.

9. The optical disc drive of claim 1, further comprising:
   a laser power unit comprising:
      a sampling interval unit that sets at least one laser power verification timer; and
      an overwrite control unit that upon expiration of a laser power verification timer, instructs the encoder module to overwrite the portion of the encoded write data with the predetermined data pattern.

10. The optical disc drive of claim 9, wherein each of the at least one laser power verification timers is associated with a first write strategy power level, and the predetermined data pattern overwritten on the encoded write data is associated with the first write strategy power level.

11. The optical disc drive of claim 9, wherein the laser power verification timer duration is set based on a determined stability of a laser power level.

12. The optical disc drive of claim 1, wherein the length of the data pattern is between 20T and 30T in length.

13. The optical disc drive of claim 1, wherein the length of the data pattern is determined based on one or more of a rise time of the front monitor diode, a fall time of the front monitor diode, and a pulse frequency of the write strategy used by the optical disc drive.

14. A method of controlling an intensity of an irradiation beam emitted by an optical disc drive laser, the method comprising:
   overwriting a portion of an encoded write data with a predetermined data pattern;
   generating a write strategy signal based on the encoded write data, the predetermined data pattern in the encoded write data being replaced with a constant value;
   driving an optical disc drive laser based on the generated write strategy signal and a power level control signal to emit an irradiation beam with a controlled intensity level;
   measuring an intensity of the irradiation beam driven by the constant value portion of the write strategy signal and the power level control signal; and
   updating the power level control signal based on a difference between the measured irradiation beam intensity and a target irradiation beam intensity.

15. The method of claim 14, wherein overwriting the portion of the encoded write data includes locating a portion of the encoded write data that does not include a synchronization sequence and overwriting the located portion with the predetermined data pattern.

16. The method of claim 14, wherein overwriting the portion of the encoded write data includes adjusting one of a length and a position of the predetermined data pattern to avoid overwriting synchronization patterns within the encoded data.

17. The method of claim 14, wherein the placed predetermined data pattern corresponds to a write strategy power level.

18. The method of claim 14, wherein a length of the predetermined data pattern is adjusted to avoid introducing run length errors in portions of the encoded data that are not overwritten.

19. The method of claim 14, wherein the data pattern violates an encoded data run length.

20. The method of claim 14, wherein the encoded data is in an NRZ format.

21. The method of claim 14, wherein intensity of the irradiation beam is measured with a front monitor diode with one of a rise time and a fall time slower that a clock cycle speed of the write strategy signal.

22. A method of measuring an intensity of an irradiation beam emitted by an optical disc drive laser in an optical disc drive, the method comprising:
 overwriting a portion of a write strategy signal with a constant value;
 driving an optical disc drive laser based on the write strategy signal and a power level control signal to emit an irradiation beam with a controlled intensity level; and
 measuring an intensity of the irradiation beam driven by the constant value portion of the write strategy signal and the power level control signal.

23. The method of claim 22, wherein the intensity of the irradiation beam is measured with a front monitor diode with one of a rise time and a fall time that is slower than a clock cycle speed of the write strategy signal.

24. The method of claim 22, wherein the constant value corresponds to a write strategy power level.

25. The method of claim 22, further comprising:
 updating the power level control signal based on a difference between the measured irradiation beam intensity and a target irradiation beam intensity.

26. The method of claim 22, further comprising:
 setting at least one laser power verification timer,
 wherein overwriting the portion of the write strategy signal with the constant value further comprises:
 overwriting the portion of the write strategy signal upon expiration of a laser power verification timer.

27. The method of claim 26, wherein each of the at least one laser power verification timers is associated with a write strategy power level, and the constant value overwritten on the write strategy signal is associated with the write strategy power level.

28. The method of claim 26, wherein a duration of the laser power verification timer duration is set based on a determined stability of the laser power level.

29. The method of claim 28, wherein the stability of the laser power level is determined based on one or more of an age of the optical disc drive laser, a temperature of one or more components in the optical disc drive, an ambient temperature, an intensity of the laser power level, and a past stability of the laser power level.

* * * * *